(12) United States Patent
Gilbert

(10) Patent No.: US 7,337,216 B1
(45) Date of Patent: Feb. 26, 2008

(54) ELECTRONIC SYSTEM ARCHITECTURE

(75) Inventor: Martyn Gilbert, Cambridge (GB)

(73) Assignee: Amino Holdings Limited, Cambridge (GB)

( * ) Notice: Subject to any disclaimer, the term of this patent is extended or adjusted under 35 U.S.C. 154(b) by 0 days.

(21) Appl. No.: 09/720,502

(22) PCT Filed: Jul. 2, 1999

(86) PCT No.: PCT/GB99/02125

§ 371 (c)(1),
(2), (4) Date: Apr. 27, 2001

(87) PCT Pub. No.: WO00/02345

PCT Pub. Date: Jan. 13, 2000

(51) Int. Cl.
*G06F 15/16* (2006.01)

(52) U.S. Cl. .................................. 709/217; 370/225

(58) Field of Classification Search ............... 713/600, 713/400; 709/208, 228; 370/270, 426, 445, 370/225; 327/147, 149; 717/128; 710/106; 326/30; 340/506; 367/130
See application file for complete search history.

(56) References Cited

U.S. PATENT DOCUMENTS

| | | | | | |
|---|---|---|---|---|---|
| 4,199,663 | A | * | 4/1980 | Herzog | 370/445 |
| 4,227,126 | A | * | 10/1980 | Denecke | 318/55 |
| 4,367,489 | A | * | 1/1983 | Holmes | 348/614 |
| 4,393,492 | A | * | 7/1983 | Bishop | 370/225 |
| 4,464,739 | A | * | 8/1984 | Moorcroft | 367/130 |
| 4,532,150 | A | * | 7/1985 | Endo et al. | 427/577 |
| 4,893,310 | A | * | 1/1990 | Robertson et al. | 370/270 |
| 4,973,943 | A | * | 11/1990 | Arima | 340/506 |
| 5,148,123 | A | * | 9/1992 | Ries | 331/4 |
| 5,184,027 | A | * | 2/1993 | Masuda et al. | 327/149 |
| 5,255,086 | A | * | 10/1993 | McMullan et al. | 725/131 |
| 5,321,819 | A | * | 6/1994 | Szczepanek | 709/228 |
| 5,347,177 | A | * | 9/1994 | Lipp | 326/30 |
| 5,420,586 | A | * | 5/1995 | Radparvar | 341/133 |
| 5,561,390 | A | * | 10/1996 | Hiiragizawa | 327/147 |
| 5,561,399 | A | * | 10/1996 | Haartsen | 331/57 |
| 5,566,343 | A | * | 10/1996 | Nishiguchi | 710/106 |
| 5,732,056 | A | * | 3/1998 | Yanagi | 369/59.19 |

(Continued)

OTHER PUBLICATIONS

A Framework for Practical Low-Power Digital CMOS.—Athas, Svensson.. (1994) (Correct) (4 citations) www.isi.edu/acmos/people/nestoras/papers/94-04.NapaOverview.*

(Continued)

*Primary Examiner*—Thong Vu
(74) *Attorney, Agent, or Firm*—Tarolli, Sundheim, Covell & Tummino LLP

(57) ABSTRACT

An electronic system architecture comprises a plurality of client devices connected in a hierarchical structure in which the client devices form nodes in the structure interconnected by communications links. One client device at the top of the hierarchical structure provides a gateway to a server and each other client device is connected to a single client device through a single communications link in an upstream direction and each client device is connected to a number, which may be zero, of client devices through the same number of communications links in a downstream direction. The downstream client devices have lower bandwidth requirements than any client devices upstream of them and the sum of the bandwidths of the communications links from each client device in a downstream direction is less than the bandwidth of the communications links in the upstream direction.

7 Claims, 10 Drawing Sheets

U.S. PATENT DOCUMENTS

| | | | | |
|---|---|---|---|---|
| 5,923,663 | A | * | 7/1999 | Bontemps et al. .......... 370/445 |
| 6,031,843 | A | * | 2/2000 | Swanbery et al. .......... 370/426 |
| 6,055,287 | A | * | 4/2000 | McEwan .................... 375/376 |
| 6,182,135 | B1 | * | 1/2001 | Ruane et al. ................ 709/224 |
| 6,185,731 | B1 | * | 2/2001 | Maeda et al. ................ 717/128 |
| 6,216,170 | B1 | * | 4/2001 | Giovannoni et al. ........ 709/250 |
| 6,430,606 | B1 | * | 8/2002 | Haq ........................... 709/208 |

OTHER PUBLICATIONS

A Mobility Framework for Ad Hoc Wireless Networks—Hong, Kwon, Geria, Gu, Pei (2001) (Correct) (15 citations) www.cs.ucla.edu/NRL/wireless/PAPER/mdm0.*

Implementing Boolean Satisfiability in Configurable Hardware—Zhong, Martonosi, Malik (1997) (Correct) (3 citations) www.ee.princeton.edu/~pzhong/papers/sa.*

An Area Efficient 128 Channel Counter Chip—Fischer Physikalisches (1996) (Correct) opalr2.physik.uni-bonn.de/doc/preprint/he9601/he9601.ps.gz.*

A Framework for Practical Low-Power Digital CMOS..—Athas, Svensson.. (1994) (Correct) (4 citations) www.isi.educ/acmos/people/nestoras/papers/94-04.NapaOverview.ps.*

Parallel-Resonator HF Micromechanical Bandpass Filters—Clark, al. (1997) (Correct) (1 citation) www.eecs.umich.edu/~ctnguyen/trans97.pf.corr.mkr.pdf.*

*Integrated Domestic System an Appliance Manufacturer's Approach . . . Household*, Scire et al., Digest of Papers from Compcon Spring, Feb. 23-26, Conf. 22, XP 000745615.

*Intelligent Home Technology Looks for Leverage From Related Markets*, Computer Design, vol. 36, No. 12, Dec. 1997, pp. 85-87, XP 000754856.

*Smarter Stuff*, Byte, Margolin, B., vol. 22, No. 6, Jun. 1997, XP 000691560.

* cited by examiner

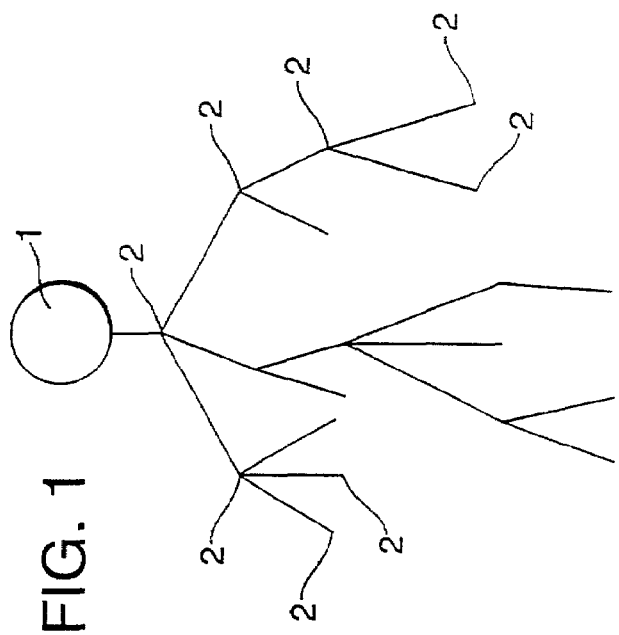
FIG. 1
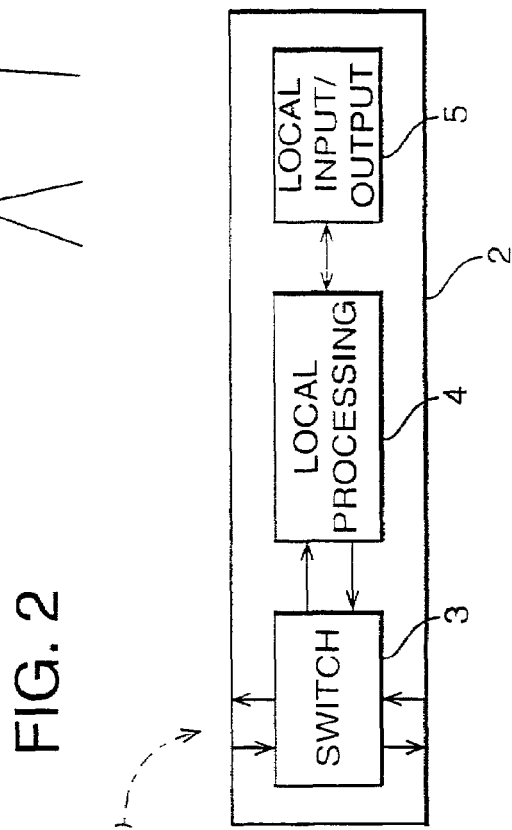
FIG. 2
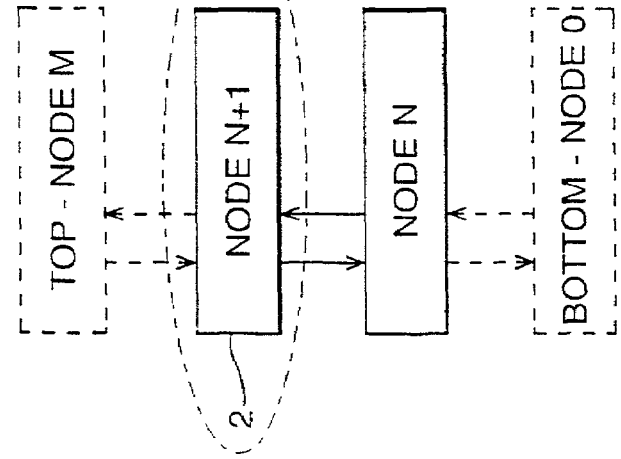

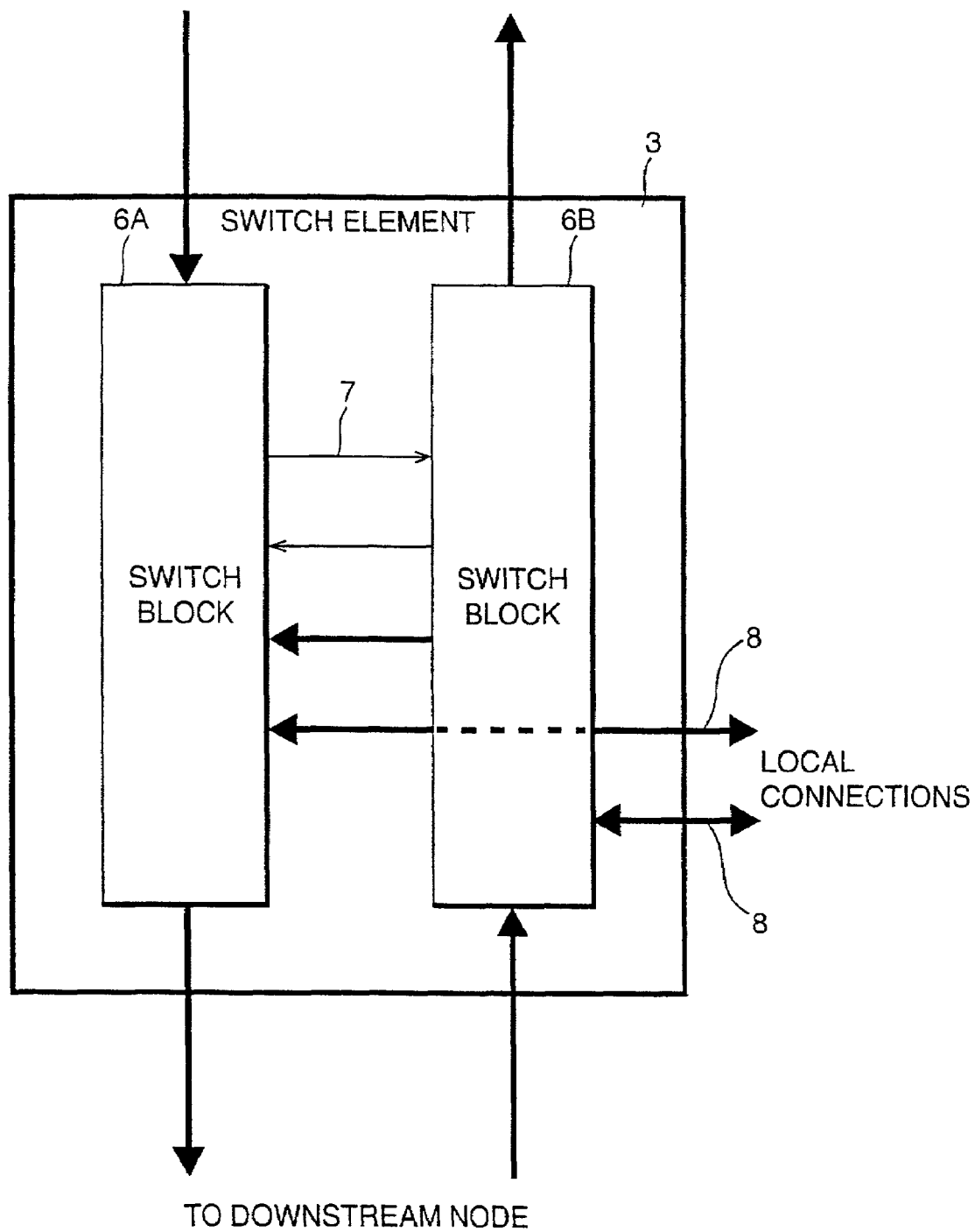

FIG. 9A

| MESSAGE TYPE (TWO BITS) | DESTINATION (SIX BITS) |
|---|---|
| DATA SIZE (TWO BITS) | SOURCE (SIX BITS) |
| PAYLOAD (32 OR 128 BITS) ||

MESSAGE FORMAT

FIG. 9B

| 00 | LEVEL 1 |
|---|---|
| 01 | LEVEL 2 |
| 10 | LEVEL 3 AND 4 |
| 11 | ACKNOWLEDGE |

MESSAGE FORMAT ENCODING

FIG. 9C

| 00 | ZERO (NO PAYLOAD) |
|---|---|
| 01 | WORD (THIRTY-TWO BITS) |
| 10 | QUAD WORD (128 BITS) |
| 11 | (RESERVED) |

DATA SIZE ENCODINGS

MESSAGE FORMAT

ELECTRONIC SYSTEM ARCHITECTURE

This invention relates to an electronic system architecture and particularly to an electronic system architecture for a distributed domestic electronic system having a connection to a larger network such as a distributed domestic computer system connected to the Internet.

Use of large electronic data carrying networks is steadily increasing. In general, the most significant and widely used network is the Internet, particularly for domestic or small business users. However, other networks such as corporate or government networks and local area networks connecting users on a single site or in a single office building do exist. Such private or local area networks are often themselves provided with connections into the Internet.

An increasing number of services are being provided or proposed for provision through the Internet and other networks. Further, numerous devices intended to be controlled through or to report and communicate through a network, often for security or safety related functions, are corning onto the market. For example, the delivery of music or television signals to allow video on demand as an alternative to broadcast television and devices such as surveillance cameras or smoke alarms.

In principle, such services can be provided through and such devices connected to any network, subject of course to the network performance being sufficient to meet the minimum requirements of a service or device. Network services can be provided through a satellite link such as DVB or DBS. However, in practice, most domestic users will be employing telecoms or cable television terrestrial links and this will also be the normal choice for most organisations. It is expected that the Internet will be the most common network choice.

As the expense of hardware to allow Internet access in general as well as remote devices such as surveillance cameras and smoke alarms is reduced and as the number of services offered through the Internet increases there is any increasing tendency to have multiple Internet accessing devices within the household and this tendency is expected to continue for the foreseeable future. For example, a single home could have one or more digital televisions able to display video on demand images retrieved through a wide area network such as the Internet or a Cable Television company or an ADSL (Asymmetric Digital Subscriber Line) connection from the local telephone company or any other network with sufficient data capacity. Such a home may also have one or more personal computers able to connect to the Internet and also possibly one or more dedicated games consoles able to download games software from the Internet or another network and optionally connect through the Internet to allow multi-player games and one or more smoke or burglar alarms and/or remote surveillance cameras.

Further, many manufacturers of domestic equipment are proposing to integrate Internet access facilities into not just music and video/television systems but also into "white goods" such as cookers, fridges and freezers to allow remote operation, on line troubleshooting and automatic re-ordering functions. Although these suggestions are currently largely speculative, these ideas appear likely to become standard or at least commonplace in time.

Most domestic users will have only a single Internet connection, generally along the domestic telephone line. This can give rise to problems with conflicts regarding demand for Internet access by different devices and by conflict between Internet accessing devices and users making telephone calls. One obvious solution to this problem is to provide the household with a separate or multiple separate Internet connections through different telephone lines. However, this brute force approach to the problem has a number of disadvantages. Most obviously, the cost penalties of having multiple telephone lines in a single household will deter consumers from such an approach. Instead, it is more likely that multiple services and multiple clients will be provided by one or more broadband connections, each of which can handle many effectively simultaneous services. Even if only one phoneline is available, the use of the Internet Protocol (IP) allows multiple low-data rate services to be offered simultaneously.

Also, although not impacting directly on the individual consumer there is a general problem with advocating technology requiring increasing numbers of telephone lines per household that the number of available telephone lines is limited. There is already a problem in some developed countries, for example Great Britain, that increasing demand for telephone connections due to the rapid increase in use of fax machines, modems and mobile telephones is resulting in the telecommunication system running out of numbers so that costly and inconvenient changes in number formats and area codes are required on a regular basis.

Accordingly, it is necessary to provide electronic systems including, but not limited to, small computer systems and networks able to connect multiple systems within a single building or household to one another and provide them with access to one or more connections to the Internet or other larger network at an acceptable cost.

One method of doing this is to connect all of the devices requiring Internet access to one another and to a server to form a Local Area Network (LAN). The server can then act as a gateway to the Internet for all of the devices and control and arbitrate internet access.

Conventionally the electronic devices in such a LAN would employ a data bus in their construction and would usually be restricted to the use of one medium such as twisted pair wiring to interconnect the server and devices. However, there are a number of problems with this approach.

Firstly, within the electronic devices, which may include but is not limited to computers, there are problems due to the global nature of a data bus. An electrical fault at any place on the bus can disrupt data propagation between any two or more communicating elements, possibly resulting in complete product or network failure.

Further, scalability is not possible on bus based systems. That is, it is not possible to add extra performance capability in response to desired workload with a linear relationship between capability and workload.

Moreover, any communication between two parties on a bus is accessible by other parties who are not intended recipients of the information. Consequently, the only method available to secure data is encryption. Even then it is not possible to prevent devices not intended to receive data from accessing the data, albeit possibly in encrypted form.

This lack of security in bus based systems may not appear to be a problem in a single household domestic system. However, there are many cases of fraud arising from illicit use of credit cards or cash dispenser (ATM) cards by family members, and the risk of mis-use of financial data within a household is a problem with data bus networks. Another problem is the provision of data services such as video on demand. The suppliers of such data effectively broadcast encrypted video data and users pay to be allowed to decrypt it. As a result, the data supplier has no objection to the encrypted video data passing through a local network, but would object to the decrypted video data being passed through a data bus because of the ease of illicit copying. Consequently there is a considerable commercial demand for products that inherently keep valuable data away from any means of copying it.

Further, the potential loss of privacy resulting from this lack of data security is a problem, even within a household.

Finally, within either an electronic product or the network or networks to which it is connected, the availability of all data at all points on a data bus means that once an illicit user gains access to any data for one device on the network, most likely by remote access to the server over the Internet or another public network, other data is potentially compromised.

These security problems are, of course, worse when the network is used by a small business or by more than one household, for example in a multiple occupancy dwelling.

Another problem with a data bus based system is reliability. Generally, any fault on the data bus will disable the entire network.

Further, in data bus based systems the overall performance of the system is limited by the speed of the slowest device. This is because the data transfer rate or clock rate of the bus cannot exceed the data transfer rate of the slowest device connected to it or reliable communication cannot be carried out. As a result, improvements in the data transfer rate of the network can only be achieved by replacing or upgrading all devices.

Also, data buses generate significant quantities of electromagnetic interference (EMI).

Finally, data bus based networks are relatively expensive, and wide busses impose circuit board, manufacturing and product size penalties, and as a result, cost penalties on the devices to be networked.

The present invention is intended to provide electronic system architectures, components, devices and networks overcoming these problems, at least in part.

In a first aspect the invention provides an electronic system architecture comprising a plurality of client devices connected in a hierarchical structure where the client devices form nodes in the structure interconnected by communications links in which one client device at the top of the hierarchical structure provides a gateway to a server, each other client device is connected to a single client device through a single communications link in an upstream direction and each client device is connected to a number, which may be zero, of client devices through the same number of communications links in a downstream direction, in which downstream client devices have lower bandwidth requirements than any client devices upstream of them and the sum of the bandwidths of the communications links from each client device in a downstream direction is less than the bandwidth of the communications links in the upstream direction and any client device able to make a hardware access request to a client device further in the downstream direction supports exception handling of the request.

In a second aspect, this invention provides a switch suitable for use in an electronic system to connect a local element to first and second bi-directional communication links, the switch comprising first and second receiving means able to receive messages along the first and second communication links respectively, first and second transmitting means able to send messages along the first and second communication links respectively and transfer means to send and receive data from the local element, in which the messages include data identifying their intended destination, the switch further comprising a message destination identification means able to identify received messages having the local element as their intended destination and the switch being arranged to pass messages so identified to the local element and to re-transmit messages not so identified received at the first receiving means from the second transmitting means and to re-transmit those received at the second receiving means from the first transmitting means without passing them to the local element.

In a third aspect, this invention provides a device having at least two communications sections suitable for connection to similar devices along different bi-directional communications links, the device having a first communications section arranged to respond to reception of a clock transition along a first communications link by transmitting a clock transition having the same polarity back along said first communications link and a second communications section arranged to respond to reception of a clock transition along a second communications link by transmitting a clock transition having the opposite polarity back along said second communications link.

In a fourth aspect, this invention provides an electronic communication network comprising at least two devices connected by at least one bi-directional communications link in which an oscillating loop is formed by a first device receiving a clock transition along the communications link and sending a clock transition having the same polarity back along the communications link and a second device receiving a clock transition along the communications link and sending a clock transition having the opposite polarity back along the communications link, and the two devices use the clock transitions travelling around the loop to provide a clock signal to control data transfer along the communications link.

In a fifth aspect, this invention provides an electronic communication system comprising at least three devices connected by at least two bi-directional communication links in which signals between two devices along each communications link are independently encrypted.

Embodiments of the invention will now be described by way of example only with reference to the accompanying direct figures in which:

FIG. 1 shows a network structure according to a first aspect of the invention;

FIG. 2 shows details of the devices making up the network of FIG. 1;

FIG. 3 shows details of a switch used in the devices of FIG. 2;

FIGS. 9A to 9C show message formats and codes suitable for use on the network;

Figure 4A:
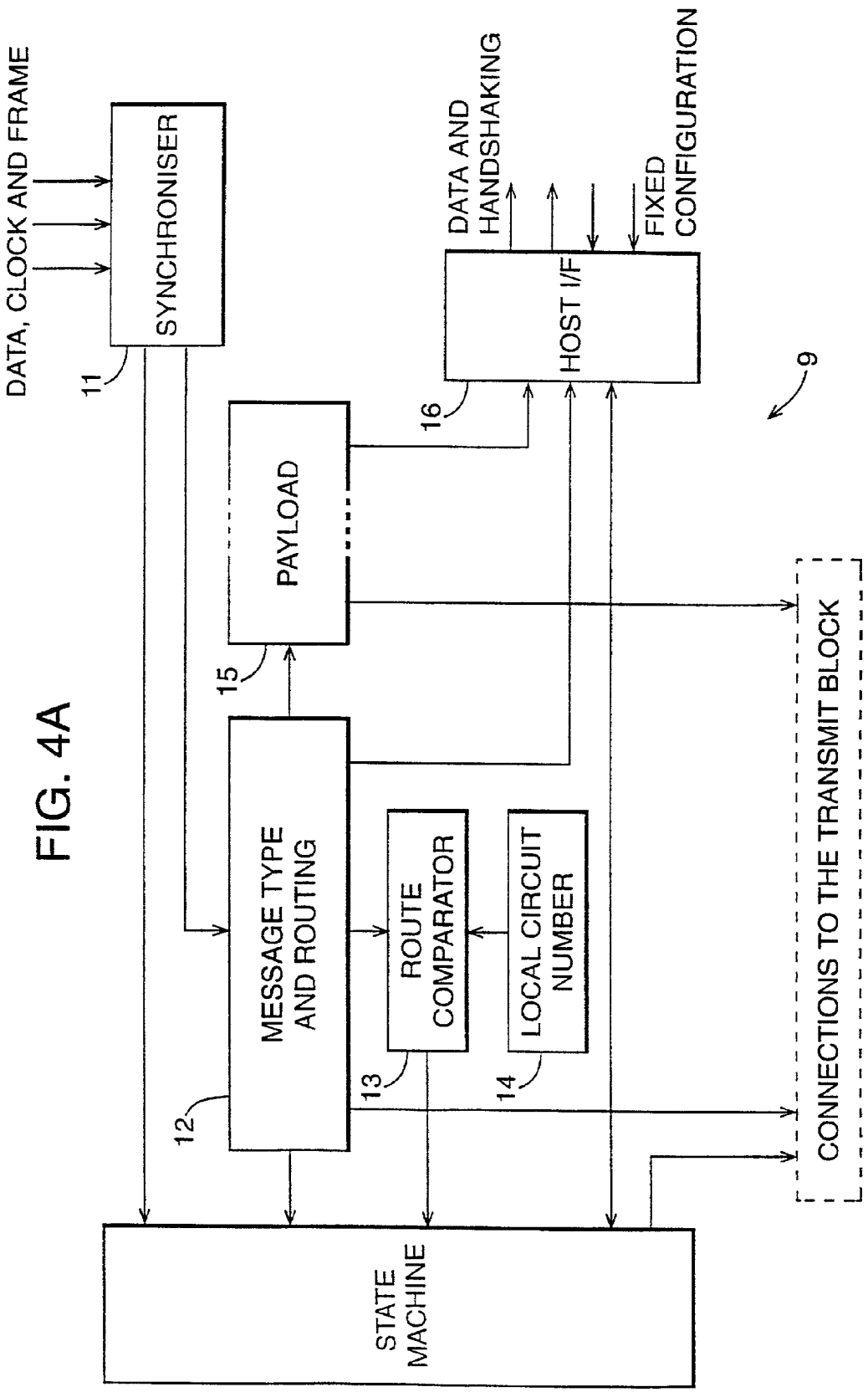
FIG. 4A shows a receiver section used in the switch of FIG. 3.

An electronic network according to a first aspect of the invention is shown in FIG. 1. This network can be made up of any communications, computer or other electronic devices and products. Although this example it is described in terms of a domestic, i.e. single household, connection to the Internet which is expected to be the most common and most commercially significant use of the invention, it will be understood that the inventive architecture is equally applicable to commercial use or connection to any other digital communications network.

In FIG. 1 a server 1, is connected to the electronic system or architecture comprising a plurality of client devices 2 arranged in a hierarchical structure though a number of local network connections to form a local area network.

The server 1 may be a single server or a network of separate servers forming a host network such as the Internet.

The client devices 2 are arranged in a hierarchical tree structure connected by branches formed by the communication links of the local area network. In the hierarchical structure branches lower down the structure have lower bandwidth than the branches above them, that is the branches through which they are connected to the server 1. Where multiple downstream branches and a single upstream branch are connected to a single node, the sum of this downstream branch bandwidths must be less than the bandwidth of the upstream branch. Security of data is secured from the bottom of the system upwards, as will be explained below.

The client devices 2 forming the end nodes of the system are client devices 2 having on-board processing capability and offer user access to server facilities. The client devices 2 forming the nodes in the structure which are not end points control the provision of services to the lower client devices 2. They will have on-board processing capability and may also themselves be client devices 2 offering user access to server facilities in their own right in addition to controlling the provision of services to the lower level client devices 2.

The reduction in bandwidth for branches further away from the server 1 is necessary in order to prevent the bandwidth requirements for the system increasing geometrically as it increases in size and to ensure that a lower level client device 2 cannot swamp a higher level client device 2 by demanding more bandwidth, that is a higher data transfer rate, that the higher level client device 2 can support.

One reason for employing a multiprocessor system comprising a plurality of different client devices is to distribute the computing and functional burden so as to place the requisite computing capability where it is most needed and to provide the appropriate electronics for a given function in the most economic and effective location to provide said function in a reliable and maintainable fashion.

Another reason for employing a multi processor system comprising a plurality of separate client devices 2 is to allow data to be kept secure. This data security may be necessary to ensure authorised control, financially reliable e-commerce or simply privacy. For example, an application processor capable of running Internet software applications may be susceptible to external attack. Thus, keeping control of an electronic commerce smart cart in a separate unit will enhance the security of the e-commerce functions and improve the predictable quality of service that can be obtained when using the smart card.

In order to provide the desired data security the inventive electronic system architecture supports hierarchical data structures. Access to a specific client device 2 is controlled by that client device 2 alone. Higher level data users, that is the server 1 and client devices 2 situated between a particular client device 2 and the server 1 must request the lower level client devices 2 for their data and be able to authenticate these requests. Of course, client devices 2 which do not have a requirement to safeguard data, may freely pass requests and responses through themselves or respond to requests for any unprotected data they hold without requiring any authentication.

Access requests from higher level client devices 2 to lower level client devices 2 may be made by hardware or software. If a higher level client device 2 is able to make a hardware access request of a lower level client device 2 this hardware access request may be permitted to pass through any intermediate client devices 2 unmodified. If the hardware access request is blocked, the intermediate level client device 2 will attempt to make the access of behalf of the higher level client device 2 if permitted. In order to allow the system to be transparent so that hardware and software access requests appear the same to the originating client device 2, the intermediate client device 2 will need to be provided with exception handling facilities, that is the facility to cause a software protocol to be employed to carry out an access request in place of an aborted hardware access request. It is undesirable to demand the use of exception processing elements at all levels in the computer system due to the resulting increase in cost. However, any client device 2 which does not support exception processing must either be an end point in the hierarchical system or be a client device 2 which never makes or passes hardware access requests to lower level client devices 2.

An example of this requirement would be a set top box able to retrieve digital video signals from the Internet for display on a digital television. The set top box will itself be a client device 2 connected to the Internet in the form of an Internet server 1 through one or more other client devices 2 and is controlled by an infrared remote control equipped with an integral smart card interface. In order to operate the remote control it is necessary to plug in the user identifying smart card. When the smart card is in place the remote control can instruct the set box to allow pay-per-view, video on demand or similar restricted access digital video signals to be displayed on the television.

Clearly, although both the set top box and the remote control are client devices 2 the set top box cannot make a hardware access to the smart card and must rely on a software protocol over the infrared link. As a result, the processor in the set top box does not need to support exception processing even though the remote control is a lower level device than the set top box in the network.

Each client device 2 forming a node in the electronic network according to the first aspect of the invention is an active information processing device able to manipulate data passing through it. Or, more precisely each client device 2 can manipulate the data it receives and can selectively re-send this data. A minimum amount of processing would be nil, that is what comes into a node goes out. Alternatively, very little of the original information received by a client device 2 forming the node may be passed on. At one extreme, a particular client device 2 may even send on none of the data received, instead it may respond to the received data by sending on a different message containing different data which is however related to or derived from the received data.

The highest upstream client device 2 nearest to the server 1 will provide a gateway to the server and will control and arbitrate server access for the entire network. This gateway client device 2 will normally have to support different communications protocols on the network and for communications with the server, although the protocols could be the same.

The passing of data through the client devices 2 forming nodes in the network allows hierarchical security to be implemented by client devices 2 at nodes higher up the network controlling provision of services to lower components while client devices forming nodes lower down the network control end user authentication. Thus, essentially, the higher nodes facilitate server side security while the lower nodes facilitate client side security.

Because the individual communications links between pairs of nodes can be physically separate and client devices 2 forming the nodes can selectively pass on received data to the next node or block it, data security on the network can be greatly improved because data is made available only to client devices 2 requiring the data and those client devices 2 forming part of the data path along which the data travels. Thus, the security feature of data only being physically accessible at particular points in the network can be used to provide an additional level of security over and above that provided by encryption alone. Further, because the data carried out between different pairs of client devices 2 and different nodes can be made not just logically but also physically distinct, failure of a single communications link or client device 2 will not necessarily disable the entire system. The extent to which the system will continue to function after a failure is of course dependent upon the size, structure and function of the network, the function of the individual client devices 2 making it up and the type and location of failure, so it cannot be guaranteed that all systems would in practice be able to continue partial functioning following all possible failures. However, the possibility of partial functioning following a failure exists in networks according to the invention in a way which cannot be provided in data bus based networks.

A generic client device 2 is shown in FIG. 2. It will be understood that this illustration is intended only as an explanatory diagram to explain the functions of a generic client device 2 and is not intended to imply any particular component arrangement or physical structure.

For illustration, a series of client devices 2 are shown arranged in an network having a top node M and bottom node 0 and the client device 2 forming intermediate node N+1 is shown in detail. The network structure of a linear string of nodes is a simple example which has been selected for clarity and it will be understood that other network structures are possible.

The client device 2 comprises three main components, a local switch 3, a local processing section 4 and a local data input and output section 5.

In operation data is passed up and down between the client devices 2 situated at the chain of nodes forming the network. At each node information is sent or received up or down the chain through the local switch 3 of the client device 2. In each client device 2 the switch 3 operates under the control of the client device 2 only. Data being passed through the network is directed to a specific destination and this destination may be defined logically or physically. All client devices 2 making up all nodes are able to receive data and those client devices 2 which are not end points of the network are able to pass data on. In principle the client device 2 at any node may initiate an information transaction by sending data to another client device 2 at another node. However, it is possible that some client devices may not do this in practice because their function only requires them to receive data and not initiate information transactions.

The switch 3 in each client device 2 can be as complex as required by the specific application. However, the minimum functionality of the switch 3 is that it must remove all received messages destined for its local client device 2 from the incoming data stream and pass on in the same direction along the network chain received messages destined for client devices 2 other than the local one.

It might appear that this functionality conflicts with the comments above that a particular client device might not pass on data in the received form but might instead send on entirely new data in response to receiving original data in response to receiving the original data. In terms of the switch functionality described above the original data would be regarded as a messages destined for the local node which would then initiate sending of the a new message carrying the new data.

As explained above, the switch 3 forwards messages destined for other client devices 2 along the chain and extracts the received message destined for the local client device 2 from the stream of messages passing along the network. These messages destined for the local client devices 2 are passed to the local processing section 4.

The local processing section 4 processes the received data as required. When necessary, the local processing section 4 passes data or instructions to a local input/output section 5 which can be a data display device or some equipment under the control of or reporting to the local processing section 4 or an interface to some external equipment under the control of or reporting to the client device 2. Similarly, the local input/output section 5 can send data as necessary to the local processing section 4. The local processing section 4 processes this data and as determined by data received from the switch 3 and local input/output section 5 and any other factors such as current time the local processing section 4 prepares messages to other client devices 2 and sends them to the switch 3 to be sent out through the network.

In principle a client device comprising only a switch 3 and local processing section 4 or only a switch 3 and local processing section 5 would be possible although in practice there are very few circumstances under which a client device able to receive, process and send data only upon the network and having no local input and output function would be useful. Similarly, although a client device able to input locally generated data directly onto the network or output data from the network directly is possible it will normally be the case in practice that at least some minimal amount of local processing within the client device 2 will be necessary.

Although the section 5 is described as the local data input and output section 5 in practice this might in some applications be data output only or data input only. The switch 3 is normally able to support a full duplex operation.

A switch 3 is shown in detail in FIG. 3. The switch 3 comprises two separate switch blocks 6a and 6b, the switch block 6a handling downstream traffic, that is the switch block 6a receives messages from the next node upstream and transmits messages to the next node downstream while the switch block 6b handles upstream traffic, that is the switch block 6*b* receives data from the next node downstream and sends data to the next node upstream.

The switch blocks 6 are interconnected by a link 7 to provide a data path for acknowledgements of received messages and each switch block 6 is connected to send out received data from the local processor 4 along lines 8.

Other than the link 7 to allow the automatic generation of acknowledgements of received messages and notification of receipt or acknowledgements there is no other direct connection between the upstream and downstream switch blocks 6*a* and 6*b*.

Each switch block 6 contains a receiver (input) section 9 and a transmitter (output) section 10 which operate under the control of a synchronising finite state machine forming part of the switch block 6.

Figure 4B:
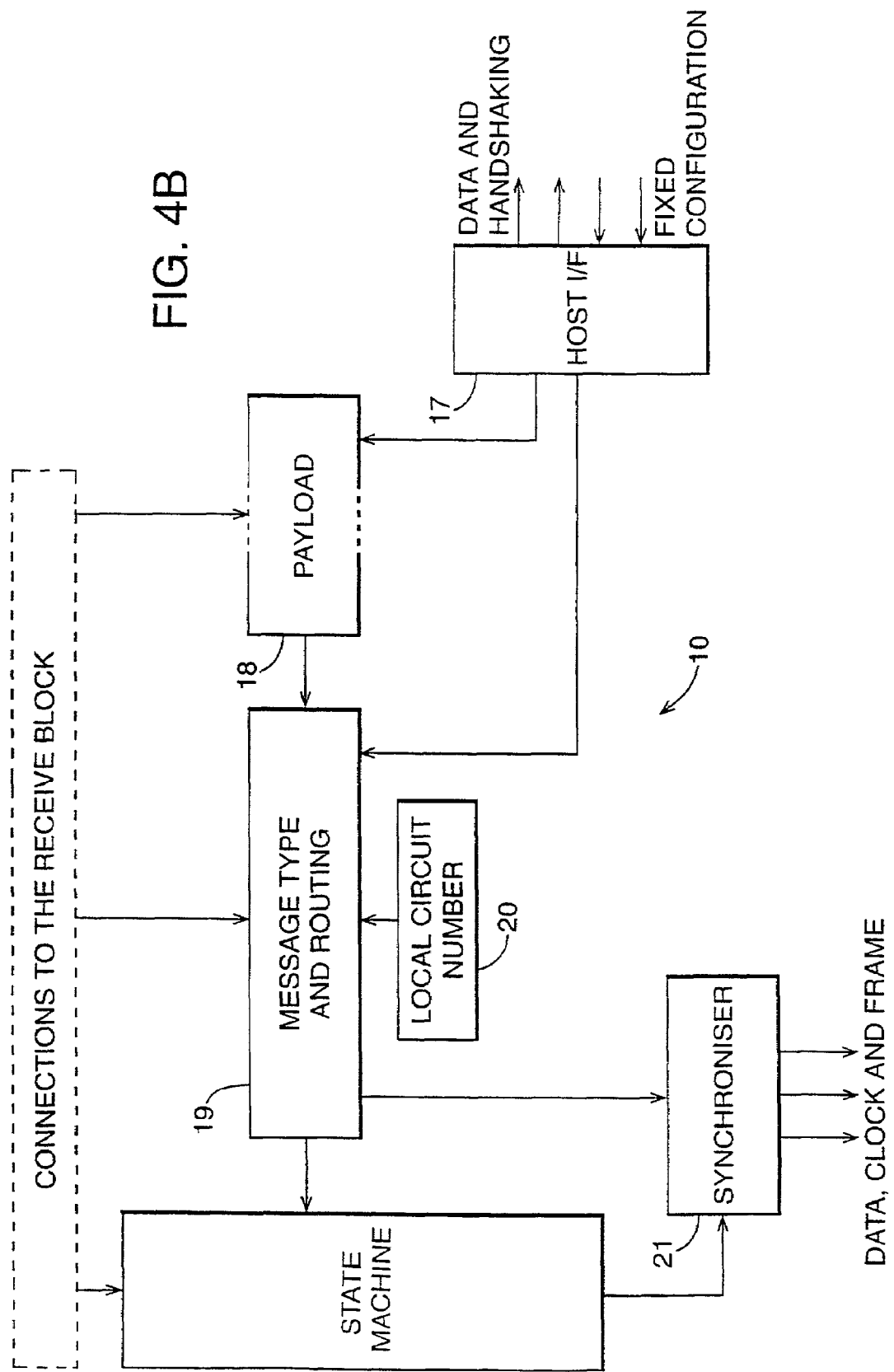
FIG. 4B shows a transmitter section used in the switch of FIG. 3.

Suitable examples of receiver and transmitter structures are shown in FIGS. 4*a* and 4*b*, in which FIG. 4*a* shows the receiver structure while FIG. 4*b* shows the transmitter structure.

The receiver section 9 receives messages only from the transmitter section 10 of a switch block 6 of a client device 2 forming an adjacent node, although the actual data carried by the message may have originated anywhere in the network.

Each message includes a message type and routing information section identifying the originating client device 2 and destination client device 2, the type of message and the amount of data carried and usually a data payload section made up of the data carried by the message. However, some types of messages, particularly acknowledgements of receipt of earlier messages, may just be identified as such by the message type and routing information section and carry no payload data.

Each message is received along the input data path by a synchroniser element 11 and then passed to a message type and routing element 12 which examines the message type data carried by the message to see what type of message it is. If the message is an acknowledgement that a message has been received, this information is passed to a finite state machine 17 which notifies the other switch block 6 of the local switch 3 that the notification has been received over the link 7, so that the other switch block 6 knows that its opposed input section is ready to receive the next message. The input section 9 then awaits the next message.

If the message is not identified as an acknowledgement by the message type and routing element 12, the message type and routing element 12 extracts the route identification information carried by the message, that is the local circuit number of the client device 2 for which the message is intended, and passes it to a route comparator 13. The route comparator 13 compares the destination circuit number extracted from the message with the local circuit number held in a local circuit number store 14. If the route comparator 13 identifies the circuit numbers as being identical message type and routing element 12 passes the relevant parts of the message type and routing information to the host IF element 16 and the message payload element 15 passes the data content of the message to the host IF element 16. The host IF element 16 sends this data to the other parts of the client machine 2. That is, this data is sent to the local processing section 4 and/or the local input and output section 5.

Alternatively, if the two items of route information are not identical the message is passed to the transmitter section 10.

In either case, once the message has been sent either to the transmitter section 10 or to the other parts of the local client device 2 the state machine 17 of the receiver section 9 instructs the other switch block 6 of the local switch 3 to send an acknowledgement of receipt response on its behalf back to the client device 2 at the adjacent node from which the message was received. This acknowledgement informs the sending client device 2 that the receiver section 9 is ready to receive the next message.

The transmitter section 10 can receive messages for transmission both from the receiver section 9 forming part of the same switch block 6 or from other parts of the local client device 2 and can be instructed to send acknowledgement of receipt messages by the receiver section 9 of the other switch block 6 of the local switch 3. Since the transmitter section 10 can only send one message at a time the state machine must arbitrate between the three message sources and some means of temporarily storing or buffering messages for sending must be provided. Further, since the operation of the receiver section 9 and transmitter section 10 of a single switch block 6 are not synchronised and may be operating at different clock rates, that is the rate at which data is received at and transmitted from a single switch block 6 may be different, and the length of the received and transmitted or consecutive messages may also be different, a buffer would be required in any event between the receiver section 9 and transmitter section 10. The necessary buffers may be locally incorporated into the receiver section 9, transmitter section 10 or elsewhere as convenient. In this example the transmit host IF section 17 which receives data from other parts of the local client device 2 incorporates a transmit buffer and another buffer is located within the switch block 6 between the receiver section 9 and transmitter section 10, but this is not shown in the figures.

When a message is to be sent the data to be carried is passed from the buffer or the host IF 17 to a payload store 18. The data is then passed to a message type and routing generator 19 which generates the appropriate message type and routing information part of the message based on data provided by the host IF 17 or simply checks and repeats the message type and routing information a ready incorporated into the received message. When the message originates from the local client machine 2 the local circuit number identifying the originating client device 2 is provided to the message type and routing generator 19 by a local circuit number store 20.

In response to an instruction from the receiver section 9 of the other switch block 6 of the local switch 3 to send an acknowledgement of receipt message, the message type and routing generator 19 generates a message type and routing information part of the message identifying it as an acknowledgement. There is no data payload to be carried by such a message.

Finally, when the ready status of the appropriate receiver section 9 of the client machine 2 at the adjacent node is confirmed, the assembled message is sent along the communications link to that client machine 2 through a transmit synchronizer 21.

In the above discussion the receiver section 9 and transmitter section 10 are both shown as being controlled by a synchronising finite state machine. There may be a separate controlling finite state machine for the transmitter section 9 and receiver section 10 or there may be a single synchronising finite state machine controlling the entire switch block 6. Similarly, separate local circuit number memories 14 and 20 are shown for the receiver section 9 and transmitter section 10. Clearly, these could be replaced by a single common local circuit number memory.

As explained above, the transmitter section 10 can transmit messages both from the receiver section 9 of the same switch block 6 or from other parts of the local client device 2 or acknowledgements as instructed by the receiver section 9 of the other switch block 6 of the local switch 3, but can only send one message at a time so that the finite state machine must arbitrate between the three message sources. In order to avoid degrading the perceived bandwidth and latency of the network, acknowledgements will take priority followed by messages passed to the transmitter section 10 from the receiver section 9 of the same switch block 6.

For clarity, the above description has assumed that each local client device 2 has a single local circuit number associated with it. It would of course be possible for a local client device 2 to be assigned multiple local circuit numbers.

In conventional bus based systems a signal sent onto the bus is received at all devices connected to the bus effectively simultaneously. That is, bus systems operate on the assumption that signals placed on the bus are propagated to all points on the bus instantaneously although there is in reality a very small difference from point to point across the bus because of the time taken for the electrical signals to physically propagate along the bus. Accordingly, buses can generally be regarded as synchronous systems because signals are available everywhere simultaneously on the bus.

In contrast, the electronic network according to the invention is an asynchronous system in which messages will be received at different points in the system at different times, the time delay being multiples of the time taken to transmit the message from one client device 2 to the next client device 2 at the adjacent node.

Figure 5A:
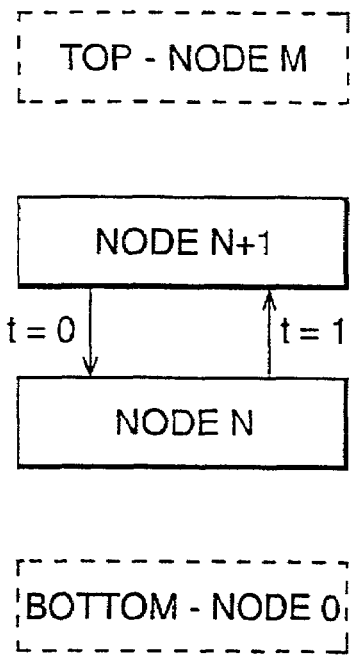
FIGS. 5A and 5B are explanatory timing diagrams showing message propagation in the network according to FIG. 1.
Figure 5B:
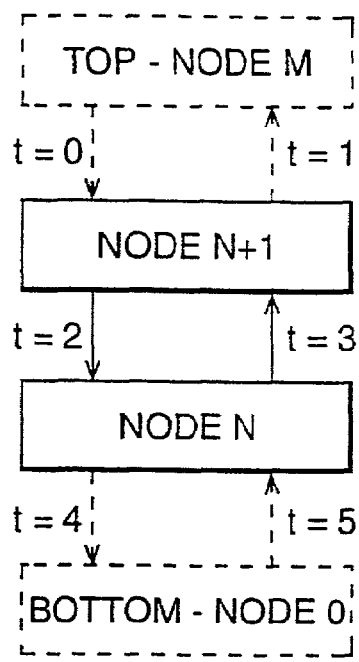

An illustrative example is shown in FIGS. 5*a* and 5*b* which show the same simple linear group of nodes shown in FIG. 2.

Referring to FIG. 5 the timing sequence of a message travelling from node N+1 to node N is illustrated. At time t=0 a message is sent from node N+1 to node N. Then, at time t=1, an acknowledgement is returned from node N to node N+1. This confirms that the message has been safely received and that the client device 2 and node N is now free to receive another message.

A more complex example is shown in FIG. 5*b* in which a message is to be sent from node M at the top of the network to node 0 at the bottom of the network. At time t=0 the message is sent from node M to node N+1. Then, at time t=1 node N+1 acknowledges receipt of the message to node N and at time t=2 node N+1 sends on the original message to node N. Note that although the re-sending of the message and sending of the acknowledgement are identified as being at times t=1 and t=2 respectively to show that they are not synchronous and can occur at different times, it is possible that they may be sent simultaneously or that the message may be sent on to node N before the acknowledgement is sent back to node M. This is because the sending of messages in opposite directions by the two switch blocks 6*a* and 6*b* in each switch 3 is independent and unsynchronised and must both wait for completion of sending of any message already being sent by their respective transmitter sections 10. Then, when the message has been received at node N, at time t=3 an acknowledgement is sent back to node N+1 by node N and at time t=4 the message is copied to node 0. Finally, at time t=5 node 0 sends an acknowledgement of receipt of the message to node N.

No acknowledgement that the message has been successfully received at node 0 is passed to node M. Only successful receipt at the next node is acknowledged at each step of the message journey. In order to minimise the amount of system bandwidth used the acknowledgement is a simple last message received acknowledge which does not contain any data identifying the original message or its content or any original message route data. The acknowledgement is always an acknowledgement of receipt of the last message sent in the opposite direction, so there is no need to include this data in the acknowledgement message.

The switch block architecture described above is a minimal implementation having only a single buffer between the transmit and receive sections. Once a received message has been passed from the receiver section 9 to the transmitter section 10 the receiver section 9 can begin receiving a second message, so that the switch block 6 as a whole is effectively double buffered.

One disadvantage of this minimalist switch block architecture is that where a series of messages are to be passed through the node, the rate at which incoming messages can be received is limited to the rate at which outgoing messages can be transmitted because a received message cannot be transferred to the buffer to allow the next message to be received until the message previously transferred to the buffer has been transmitted. This problem can be overcome by use of a more complex architecture by increasing the size of the buffer to allow multiple messages to be held, allowing the switch block 6 to act as a speed matching element. Such an enlarged buffer able to hold multiple messages must be a first in first out (FIFO) type memory to keep message order passing through a node constant, but there is no limit to how many messages the FIFO buffer can hold, that is the FIFO buffer can be arbitrarily deep as required to allow smooth data flow and is only limited by cost.

The network architecture described above provides a basic level of security for data within the system because messages sent to a client device 2 at a particular node are extracted from the signal flow along the network by the local switch 3 and so are not available or accessible to client devices 2 at nodes further along the network. Further, messages sent through a client device 2 at a particular node to a client device at another node are passed through the local switch 3 of the intermediate client device 2 only and are not supplied to the local processing section 4 of the intermediate client device 2.

This basic level of security is of course vulnerable. Normally, it would be possible for a user of a client device to use the local processing section 4 to gain access to messages passing through the local switch 3 to other client devices 2, but casual eavesdropping would be prevented. Also, anyone with physical access to the system could use instruments such as a logic state analyser to record transactions along a data path and an unauthorised node could be then inserted into the data path to intercept legitimate messages and inject messages to carry out some form of attack on the network's data integrity. However, such an attack is dependent upon having physical access to the system.

Better data security can be obtained by encrypting the messages sent along the individual data links between pairs of connected nodes.

Figure 6:
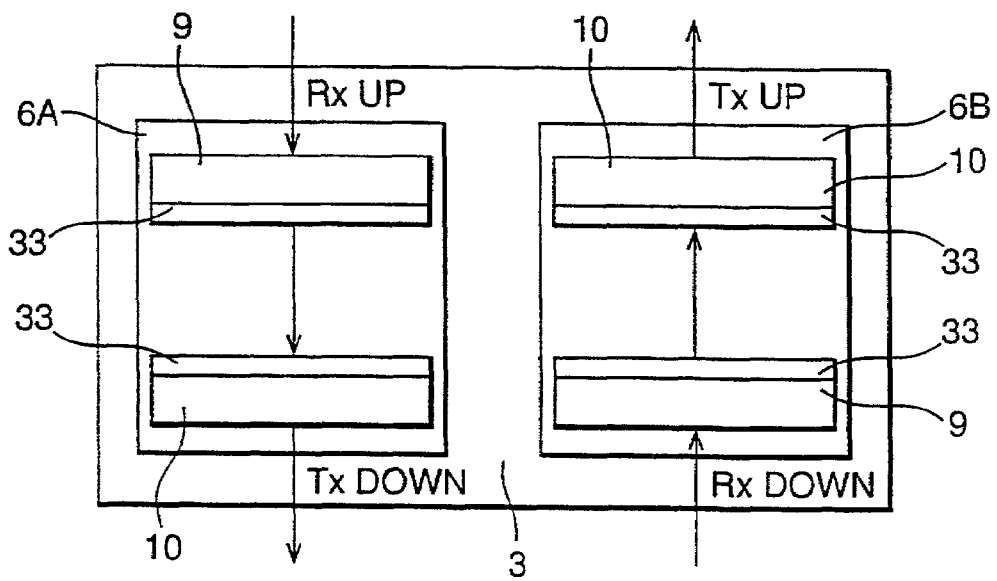
FIG. 6 shows an encryption system suitable for use in the network.

A first method of doing this is shown in FIG. 6, in which each of the receivers 9 and transmitters 10 making up the switch blocks 6 of a local switch 3 is provided with a programmable exclusive OR element 33 which applies a logical exclusive OR function to each message after reception by the receiver section 9 or before transmission by the transmitter section 10.

The exclusive OR function applied by the programmable exclusive OR elements 33 in each local switch 3 takes the form of an exclusive OR mask controlled by the local processing section 4.

The exclusive OR mask encodes the entire transmitted message so that as well as the actual data carried by the message the message header and routing information such as the recipient virtual circuit identification, data type and data size are all encoded.

The exclusive OR mask applied by the exclusive OR elements 33 may be modified periodically by sending messages to all of the client devices 2 in the system instructing them to change the exclusive OR mask.

Such a system will render attacks on the system using a logic state analyser worthless because it will not be possible to identify what messages mean and even if an attempt is made to deduce the exclusive OR mask used this should be defeated by the periodic changes.

When changing the exclusive OR masks, this can either be done by instructing all client devices 2 to change into the new exclusive OR mask at a set future time or by propagating a mask change message through the network so that each client machine 2 in turn receives the mask change message telling it to apply the new exclusive OR mask to all future messages and to re-send the mask change message to the next client device 2 at the next node. Either approach should be effective, although the asynchronous nature of the system and the fact that the switch blocks 6 operating in opposite directions in the same switch 3 and the receive and transmit sections 9 and 10 of each switch blocks 6 are not synchronised will require some protocol to be applied to deal with messages being transmitted or received when instructions to change the exclusive OR mask are received or are due to be executed.

The messages encrypted by the exclusive OR mask are identical in size to the original messages before encryption and accordingly this encryption method does not impose any band width penalty on system performance.

An improved level of security can be provided by the incorporation of an auxiliary security processor within each local switch 3.

Figure 7:
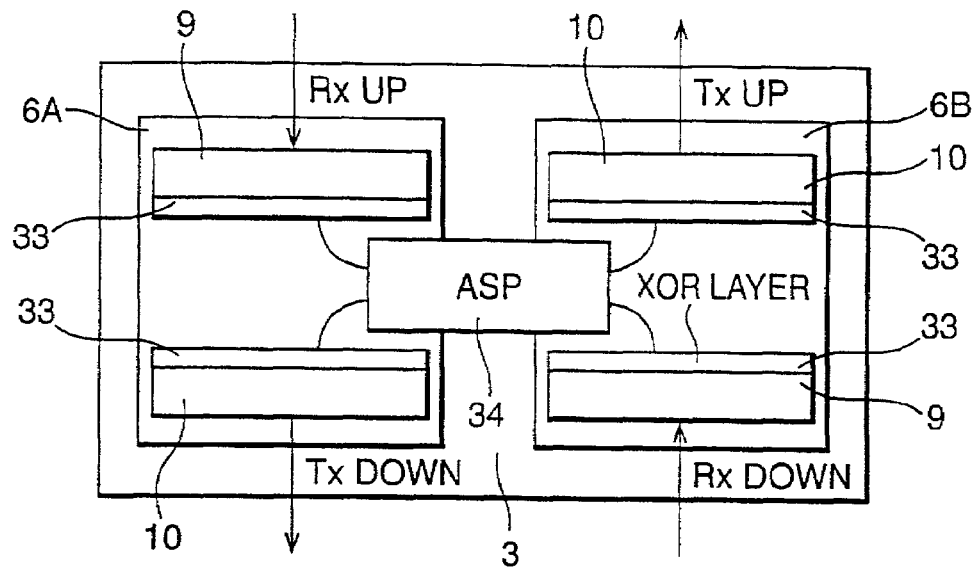
FIG. 7 shows an improved encryption system for use in the network.

Referring to FIG. 7 a local switch section 3 is shown comprising two switch blocks 6a and 6b operating on the downstream and upstream data paths though the switch 3 respectively. The local switch 3 also includes an auxiliary security processor 34.

The auxiliary security processor 34 sets the exclusive OR masks applied by the exclusive OR elements 33 instead of the exclusive OR masks being set by the local processing section 4 as in the system without the auxiliary security processor 34 described above.

In operation, the auxiliary security processors 34 in the opposed local switches 3 in client devices 2 in adjacent nodes communicate with one another exchanging public encryption keys. The auxiliary security processors 34 then use these public keys to encrypt and issue exclusive OR masks to each other which are applied to the messages sent between them. This communication and exchange of public keys is carried out by injecting additional messages into the message stream along the communications link between the two nodes. This will require additional received message routing and processing and transmit message arbitration by the receiver sections 9 and transmitter sections 10 since the system will now be carrying messages to and from the auxiliary security processor 34 at each local switch 3 as well as messages to and from the local processing sections 4 and messages to be passed on along the network to other nodes and acknowledgements.

The exchange of public keys and setting of exclusive OR masks is carried out separately by each auxiliary security processor 34 for messages to and from the next node upstream and to and from the next node downstream so that the upstream messages and downstream messages will be encrypted and decrypted using different exclusive OR masks.

At intervals, each auxiliary security processor 34 will re-establish communication with the auxiliary security processors 34 in adjacent nodes and in a synchronised manner they will change the exclusive OR masks. Using this system it is only necessary that the exclusive OR masks are changed at the same time at both ends of each communications link between nodes, there is no requirement that all of the exclusive OR masks in the network be changed simultaneously. Thus, as well as the intervals at which the exclusive OR masks are changed being time based they could also be changed independently based on the number of messages exchanged along each communications link or based on some combination of these two criteria.

It is normally convenient to employ the same exclusive OR mask in both directions on any given communications link between nodes. However, this is not essential. It is only essential that the same exclusive OR mask be used to encrypt and decrypt messages in one direction along each communications links. The exclusive OR mask used in the receiver section 9 of the downstream switch block 6a and exclusive OR mask employed in the transmitter section 10 of the upstream switch block 6b in a given local switch 3 need not be the same. Similarly, the intervals at which these exclusive OR masks are changed could be different. However, having different masks in each direction on the same communications link will effectively double the amount of processing which must be carried out by each auxiliary security processor 34 and double the amount of messages which must be sent to control the encryption. Accordingly, the use of the same masks in each direction on each communications link may be preferred.

The use of the same or different encryption masks in each direction on each communications link are equally valid and which is used is a matter of designer or user choice.

One advantage of this system is that the encryption process is carried out entirely by the auxiliary security processors 34 contained within each local switch 3 so that the local processing sections 4 and any related applications do not have control over or have access to the mask generation and encryption process. This increases the security of the encryption because a user cannot access any data regarding the encryption masks used from an application at a client device 2. Further, even if the local switch 3 of a client device 2 is physically accessed, only the encryption masks used for messages passing to and from that local switch 3 are compromised, and these messages are available at the local switch 3 anyway.

Another advantage is that the actual mask generation and encryption by the auxiliary security processor 34 does not have to be carried out in real time. That is, the mask generation and encryption can be carried out by the auxiliary security processor 34 out of band while the rest of the local switch 3 is sending and receiving messages using the already set exclusive OR masks. As a result, the time taken to carry out the mask generation and encryption process is not critical so that the auxiliary security processor 34 can be simple, small and cheap microprocessors, enabling them to be incorporated into the local switch elements 3 with only a marginal effect on costs. The auxiliary security processor 34 could be embedded in macro cells within the local switch elements 3.

In the above examples the auxiliary security processors 34 are shown as a single unit connected to both of the switch blocks 6a and 6b of a local switch 3. It would of course be possible to employ separate auxiliary security processors within each security block 6a and 6b but the two auxiliary security processors will have to be in contact with one another to properly control the encryption process.

This arrangement ensures that any attempt to compromise the system and extract data would have access to only a part of the data carried on the network for a relatively short period of time.

When the network is first switched on, or after a network wide system reset, the auxiliary security processors 34 will exchange public keys and set the exclusive OR encryption masks before allowing any other messages to be sent.

A method of further enhancing the security provided by the auxiliary security processors 34 is to incorporate smart card user authentication into the local switches 3.

Figure 8:
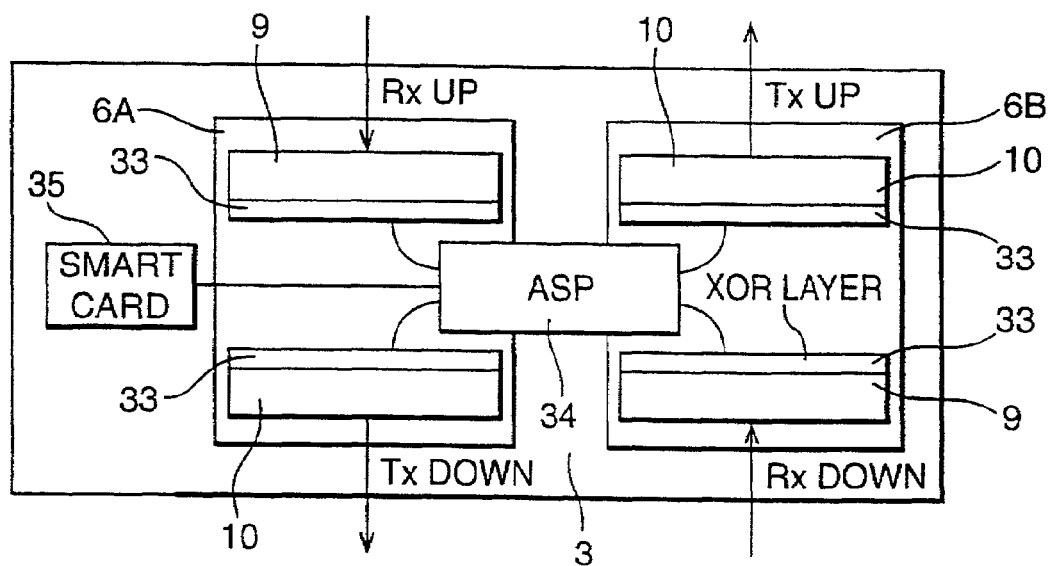
FIG. 8 shows another improved encryption system for use in the network.

An example is shown in FIG. 8 where a smart card connector socket 35 connected to the auxiliary security processor 34 is incorporated into the local switch 3.

Insertion of the smart card into the socket 35 acts as user authentication and enables the auxiliary security processor 34 to begin operation. Further, the smart card 35 provides a seed or seeds for the exclusive OR encryption masks used.

When a smart card is not present in the smart card socket 35 the local switch 3 is unable to function because the auxiliary security processor 34 will not set the exclusive OR masks and enable operation of the switch blocks 6a and 6b. Of course, it may be convenient in practice to also include connections from the smart card socket 35 to other parts of the local switch 3 to disable further parts of the local switch 3 when the smart card is not present in the socket 35.

Further, even if a physically compatible smart card is connected to the smart card socket 35, if this smart card is not a correct smart card, for example if it is valid only until a given date, which has passed, it will not be able to provide an exclusive OR mask seed to the auxiliary security processor 34 which is compatible with the network requirements. As a result, the auxiliary security processor 34 will be unable to set effective exclusive OR encryption masks matching those used at switches 3 at adjacent nodes and the local switch 3 will again be unable to function.

As explained above, even without the use of an auxiliary security processor 34 the method of operation of the network architecture according to the invention provides some security. Whether the improved encryption based security options as described above are used or not will, like most security decisions, be a trade off between the importance placed on security and costs.

If user authenticating smart cards are to be employed they can be used for one, some or all local switches 3 in the network depending upon the degree of security required. In some very high security applications it may be appropriate to employ smart cards for user authentication at all local switches 3 while in less security critical applications it may be sufficient to employ smart card user authentication only at the gateway client device 2 connecting to the Internet or the gateway client device 2 containing and generating the most security critical data.

It will be understood that the above described security features are a function of the network hardware and software itself and are entirely independent of and transparent to applications employing and operating over the network. Any application based security features such as data encryption by the applications are entirely independent of the security features described above.

The use of exclusive OR masks is advantageous because is imposes little extra delay on message transmission and reception, does not increase message size and can be simply and cheaply implemented. However, alternative encryption masks or arrangements could be used.

One example of a message format and codes suitable for use in a system of this type will now be described.

As shown in FIG. 9a the message format has a message type and routing section comprising a 2 bit message type code, 2 bit data size code, and 6 bit destination and source identifiers. The message format may also have a data section comprising a 32 or 128 bit data payload.

This arrangement simplifies the logic employed in the finite state machines of the switch blocks 6 as the bit counter and early termination can be processed during the following field.

Use of the 6 bit source and destination code in the example would limit the network to 64 client devices at 64 nodes. This is considered to be adequate for most domestic systems. However, this is purely an example and more destination and source identifier bits could be made available as required.

The message type codes are shown in FIG. 9B and these identify the message as being an acknowledgement of the last message sent or the security level of the message. In this example, level 1 messages are non-secure messages between processing elements at the nodes. Each node may only send data request messages or responses to earlier requests in this format and may only receive requests for data or return information in response to an earlier request. Message passing of this type is normally used to report interrupt requests and carry network protocols.

Messages including data being sent to and from the applications of the client devices 2 rather than to and from the switches 3 themselves are also regarded as level 1 messages.

Level 2 messages are pre-encoded messages between application processors to set up inter-node encryption masks and are essentially special purpose level 1 messages.

Level 3 and 4 messages are used for communication between the auxiliary security processors 34 at different nodes.

Acknowledgement messages contain no data payload and are specifically identified as such by the message type code.

The data size codes are shown in FIG. 9c and these indicate whether the message includes zero data, one word (32 bits) of data or four words (128 bits) of data as a payload. Normally, only acknowledgements will have a zero data content.

As indicated in FIGS. 4a and 4b the communications link between adjacent nodes carries data, clock and frame signals.

The data signal is of course the actual data making up the messages carried on the network as explained above.

The clock signal is required to ensure that the opposite transmitter and receiver sections 9 and 10 in the switches 3 at each end of each communications link in the system are sending and receiving data at the same rate in order to allow reliable transmission of data.

Conventionally, networks operate with a common clock signal throughout the network with any differences being due to propagation delays only and indeed such a common clock arrangement is mandatory in a data bus type system.

Figure 10:
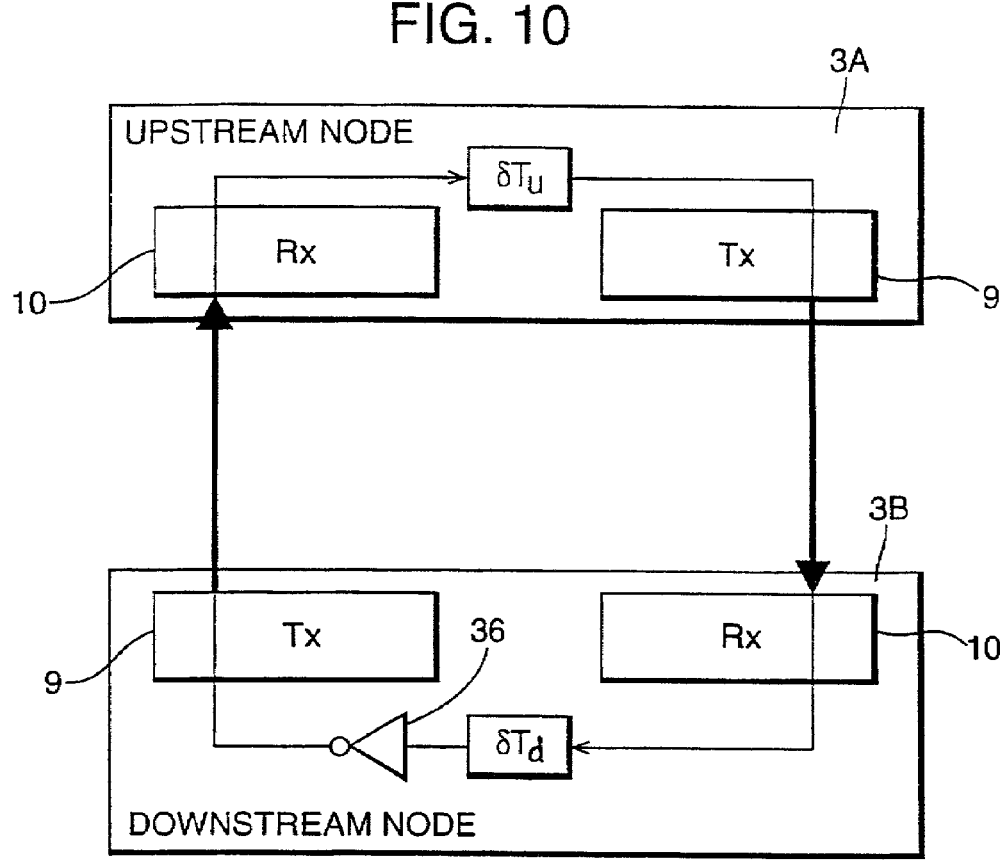
FIG. 10 is an explanatory diagram showing how clock pulse circuits are automatically generated between the devices of the network.

In the inventive electronic network architecture, the opposite transmitter and receiver pairs 9 and 10 in the switches 3 of adjacent nodes are connected so as to form an asynchronous logic loop which generates a clock sign used to synchronize the transmitters and receivers and the data link between them. This logic loop is shown diagrammatically in FIG. 10.

A clock status transition is generated in the transmitting section 9 of the upstream local switch 3a at the upstream node and sent along the communication path to the receiving section 10 of the local switch 3b at the downstream node. The clock transition is then inverted by an inverter 36 to provide an opposite polarity clock transition and re-sent by the transmitting section 10 of the downstream local switch 3b back to the receiving section 9 of the upstream local switch 3a where it is passed back to the transmitting section 9 and re-sent.

This provides a loop with a gain of −1.

If the total delay around the loop is regarded as $\delta Tu$ plus $\delta Td$, where $\delta Tu$ is the delay passing through the upstream local switch 3a and $\delta Td$ is the delay passing through the downstream local switch 3b the clock pulse loop will resonate at a frequency having a period of approximately 2 ($\delta Tu+\delta Td$).

In the system it is a requirement that the delay in either node, that is $\delta Tu$ and $\delta Td$ are sufficient for a transmitter section to send a bit from its output register or for a receiver to correctly receive and store an incoming bit.

In the loop the inverter gives a 180° phase shift and the rest of the phase shift at the loop resonating frequency is provided by the various delays to the signal going around the loop.

This allows the clock signal used on each data link in the network to be automatically set to the optimum value for the quickest data transfer allowed by the electronics in the opposed local switches 3, the length of the communications link and ambient temperature.

The switches 3 are arranged so that when their upstream or downstream sections are not connected to another switch 3 through a communications link, an unconnected downstream transmitting port is held at a clock logic level of one while an unconnected upstream receiving section is held at a clock logic level of zero.

When the unconnected upstream and downstream sections of two powered switched are connected in opposition through a communications link, the logical one produced by the downstream transmitting section of the upstream switch 3 overrides the logical zero on the upstream receiving section of the downstream switch 3. This change appears to the downstream switch as a clock status transition so that the loop begins oscillating as set out above.

This provides the advantage that new client devices can be connected to the system in operation and a clock signal enabling communication with the new client device will automatically be generated. Further, when a client device is not connected the unconnected ports are held at a constant voltage level with no A.C. activity and so will not generate any electromagnetic interference.

Systems enabling automatic connection of new elements to an operating system, so called hot plugging, exist, but known systems of this type require the continuous transmission of alternating signals, such as clock signals, at the unused connectors in order to allow connection of a new device to be detected. As a result, such known systems generate large amounts of electromagnetic interference (EMI).

Further, known systems of this type require complex hardware and software to allow newly connected devices to be integrated into a system.

It will be understood that the above description is purely exemplary. The clock logic levels held at the different unconnected ports can be varied in many combinations provided that an apparent clock pulse status transition is generated on connection.

The use of a single inversion in the loop is not essential, the essential criterion is having an odd number of inversions. The precise location of the or each inversion is unimportant, the inverter 36 can be in either switch 3.

It is preferred that the loops are driven by an initial clock pulse from the upstream switch 3.

If one of the local switches 3 is replaced by a new model able to operate faster the reduced delay in the loop will automatically cause the clock signals for the communications links the switch is using to be increased. Similarly, changes in the delay times across the data links, for example due to replacement of one cable with another of different length, will be automatically compensated for by a change in the clock rate, as will changes in the operating speeds of the switches 3 due to temperature changes.

It should be understood that the clock rate for each communications link in the network may be different and in practice it probably will be at least slightly different. Further, although the internal clock rates used by the switches 3 and the clock rates used to transfer data through the connecting data links are related because any increase in the switch clock rate will allow an increased data transfer clock rate to be supported along its data links, they are not the same.

Although the above described technique for setting clock rates across data links is regarded as highly advantageous it is not essential and in some situations will not be practical. In order for this automatic setting of clock rates technique to be used there must be a two-way data link between the switches at two adjacent nodes. Where only a one-way data link is provided, for example where only a one-way infrared data link is present, a conventional method of setting and synchronising clock rates will have to be used.

Figure 11:
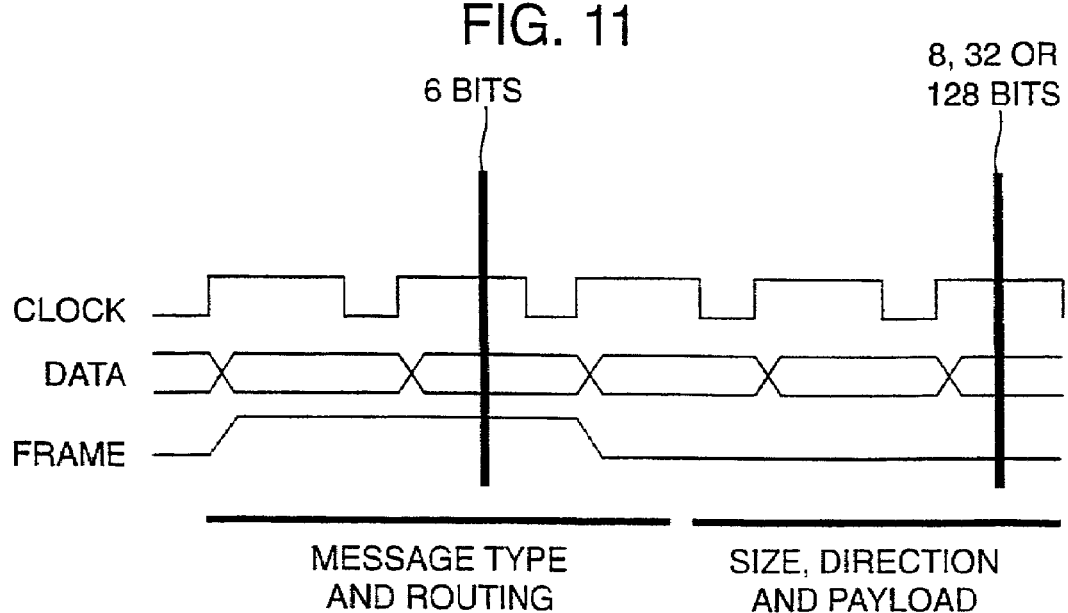
FIG. 11 shows examples of clock data and frame signals on the network.

An example of the clock, data and frame signals in one direction along a single communication link is shown in FIG. 11.

The use of bit-synchronous timing is preferred to allow the data rate between adjacent nodes to be as high as possible without losing bandwidth due to preambles for synchronisation. This is also simple to implement.

Messages may be partially pipelined if desired. If mid-message pipelining is to be used, the local switches 3 along the pipelined data route must cooperate so that they are all using the same clock rate along all of the communication links. This common clock speed will have to be the lowest along the data route. Accordingly, setting a common clock rate should be carried out by the local processing sections 4 of the client devices 2 requiring message pipelining instructing the necessary switches 3 to do this only when pipelined messages are to be sent, the locally set clock rates as described above being otherwise used.

In any given network, one node will be the furthest upstream and one will be furthest downstream. The furthest upstream node is deemed to be the network master for position resolution purposes and allocation of logical or virtual circuit numbers. Being at the uppermost node, on startup or reset it will not have an incoming clock signal on its output (upstream) facing receiver. On start up or system reset all switches 3 send clock signals downstream and the presence or otherwise of a received clock signal from upstream is used to determine whether or not a node is a master. After clock signals have been received or not for a preset period, the fact that a switch 3 is at a master node or not will be indicated in a status register and then reset status will be de-asserted.

After reset all switches 3 are configured with an assigned address of zero. The assigned circuit is then determined from the master node outwards by the switch 3 at the master node being logical circuit zero and sending a message downstream to node 1 giving the logical circuit number 1. The switch 3 at node 1 captures that message and assigns itself the received circuit number, using the result as its own node address. The switch 3 at node 1 then increments the received circuit number and sends it downstream to node 2. This process continues, assigning the virtual circuit numbers node by node. If necessary, a given node may be allocated more than one circuit number. These address allocation functions may be carried out by hardware or software in the switches 3 or by local processing in the client device 2.

This automatic assignment of node numbers is necessary instead of node numbers being permanently initially assigned in order to allow for the possibility that switches could be added or removed or moved from place to place in an network over time requiring reassignment of numbers. Further, resetting followed by assignment of new identifying numbers may be useful or necessary in order to allow a partial network separated from a larger network by a component failure to continue functioning independently.

It is possible that the equipment at each node will not have the same capabilities. The possibility that different nodes may be able to support different clock rates is dealt with by the automatic clock rate setting method described above.

The equipment of all nodes must be able to support asynchronous byte wide and synchronous byte wide transfers but all other features are optional. On system startup or reset local processing must establish what facilities are available at each node in the network.

For example, a local processor able to send and receive 128 bit messages must check not only that the recipient node of a message is able to send and receive 128 bit messages but also that all intermediate nodes are able to do this if 128 bit messages are to be sent. Otherwise, the message will have to be broken down into a number of smaller messages which can be handled by the intermediate nodes.

The above descriptions of the operation of the computer network architecture and the network functioning specific parts of the client devices 2 has been discussed only with reference to a very simple linear network. However, as shown in FIG. 1 more complex network structures in which nodes can have multiple links to multiple downstream nodes are possible. In order to service the multiple downstream communications links such multiply connected nodes will required local switches 3 employing upstream and downstream switch blocks 6a and 6b having multiple downstream facing receiver sections 9 and transmitter sections 10.

In the downstream switch block 6a the only additional requirement is hardware or logical switching to allow the appropriate one of the transmission sections to be selected based upon the message destination address.

The upstream switch block 6b will require additional buffering and message arbitration in order to allow for the possibility of multiple messages being received simultaneously on the different downstream timing receiving sections and arbitrating which received message should be transmitted next.

The use of separate transmitting sections to each communications link is not strictly essential, a single transmitting section could be used together with switching downstream of the transmitting section to select the destination node. However, the use of separate transmitting sections for each communication link is preferred because this allows the automatic clock rate setting technique and enhanced security techniques outlined above to be used fully.

The network architecture described can also be used as an architecture within the individual client devices 2 to provide the local processing section 4.

Although such an approach to device architecture is overly complex for a single processor device, in practice most devices will be multiprocessor devices which can benefit from this architectural approach.

Figure 12:
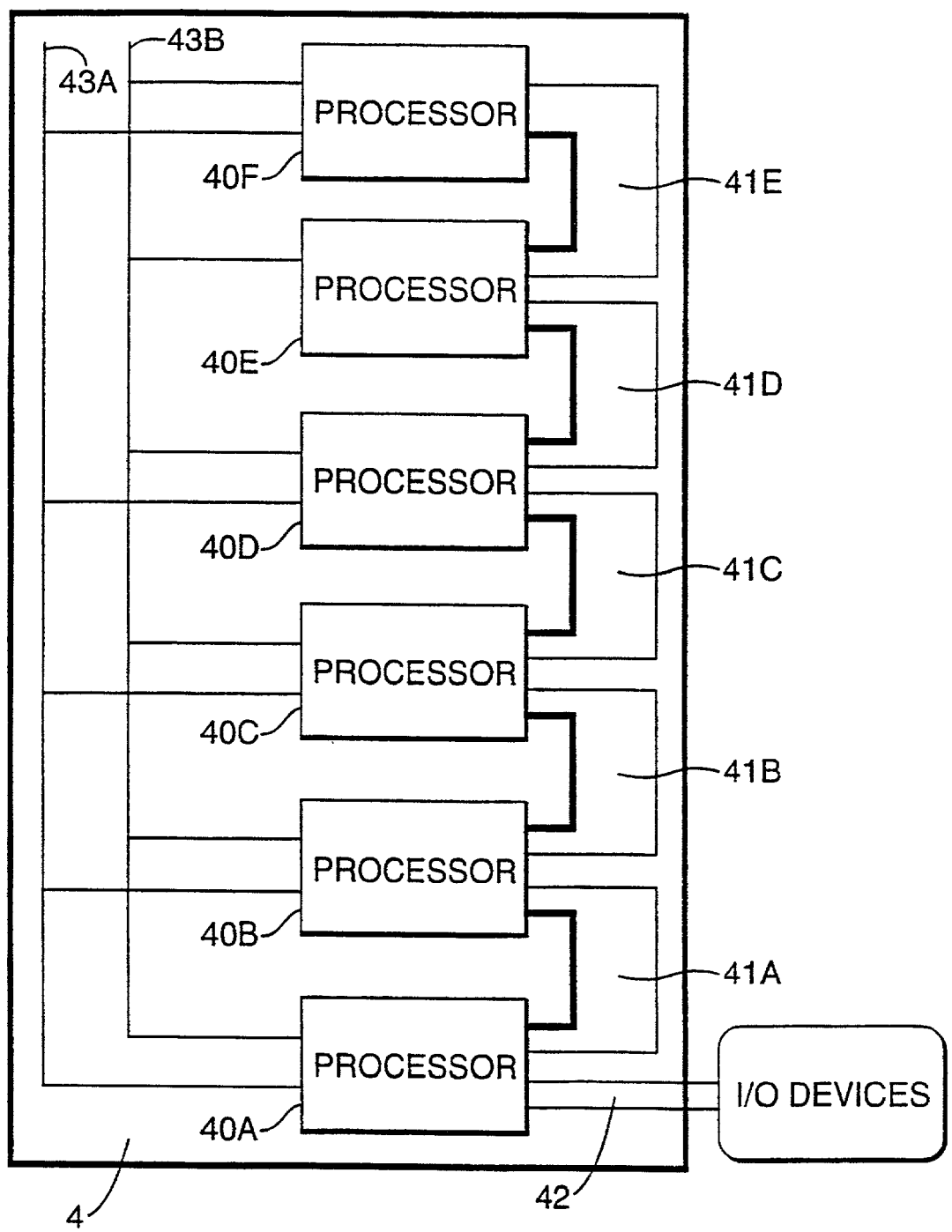
FIG. 12 shows a device architecture according to the invention.

A typical multiprocessor and local processing section 4 is shown in FIG. 12.

The processing section 4 is formed by a plurality of processors 40, six processors 40a to 40f in the example, linked together into a chain by a series of in/out buses or data transfer links 41a to 41e, each of which links a pair of processors 40.

Data is carried in and out of the processing section 4 by an in/out bus or link 42 leading to other elements such as the local switch 3 and local input and output section 5. Although the connections 41a to 41e can be buses, such buses will only link two consecutive processors 40 in the chain and not all of the processors 40 as in a conventional bus-based multi-processor device.

Separate video input and output buses 43a and 43b linking all of the processors 40 are provided in order to prevent video devices from swamping the interprocessor connections 41 with very large quantities of video data.

The processing section 4 operates similarly to the linear network described above with the processor 40a being regarding as the highest upstream processor and controlling external access to and from the processing section 4.

It will be understood that all data transfer to and from the downstream processors 40 is potentially gated and controlled by the upstream processors 40, thus providing security. However, similarly to the network, a processor 40 which does not wish to apply security controls to the transferred data can just pass it through unmodified.

The processors need not be exclusively arithmetic, they could be audio or video processors having their own separate inputs and outputs.

Figure 14:
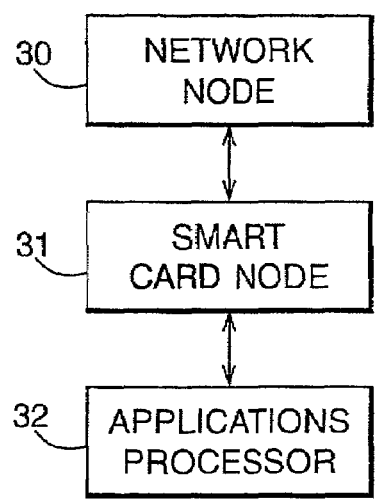
FIG. 14 is an explanatory diagram showing security features of the device architectures.

A simple illustration of this principle is shown in FIG. 14. The device in FIG. 14 is extremely simple having only three nodes, the first network node 30 being connected to a second smart card node 31 which is connected in turn to a third applications processor node 32. The network node 30 is formed by a processor forming a connection to the local switch 3. The smart card node 31 incorporates a smart card connector. Data sent to and from the smart card from the network cannot be intercepted by the applications processor at the applications processor node 32 because the data sent to and from the smart card, which may incorporate e-commerce or biometric data, are simply not physically passed to it.

This level of basic security is only reliable for embedded applications in a client device 2 which only receives software upgrades by a protected service, in this example by smart card. Otherwise, the software within the smart card node 31 could be remotely altered so that the messages containing the sensitive data were copied to the processor at the applications processor node 32.

Similarly to the network security described above this level of security is vulnerable to anyone with physical access to the device because a logic state analyser could be used to record transactions along a data path and then allow an unauthorised node to be inserted. However, such an attack is dependent on having physical access to the device and this may not be possible, for example where the device is an automatic teller machine (ATM) or inside medical equipment.

Figure 13:
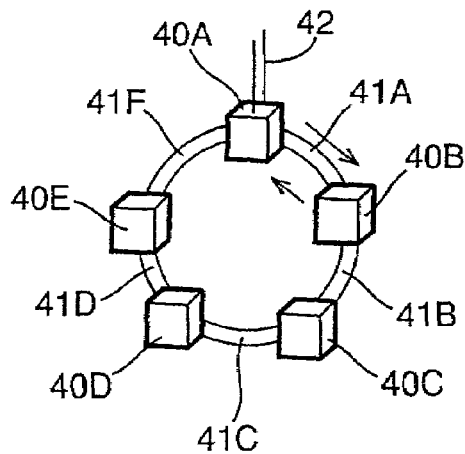
FIG. 13 shows an alternative device architecture according to the invention.

An alternative structure is shown diagrammatically in FIG. 13 where a device 4 having five processors 40a to 40e has had an additional communication link 41f connected between the most upstream processor 40a and the most downstream processor 40f so that the processors are linked in a ring. This structure will support dual control rotating loop communication links. In this illustration the possible separate video input and output buses are not shown for clarity.

There are a number of advantages to this ring structure. The first is increased redundancy and improved system integrity. If the ring is broken at any point by failure of a communications link 41 or a processor 40 communication between the remaining parts of the device can still be effected by routing messages around the loop in the direction avoiding the break.

In the event of a suspected failure any processor 40 can test the integrity of the loop by attempting to send messages to itself in both directions around the loop and if one or both of these messages is blocked sending messages to the other processors 40 in turn until the failure point can be determined.

Although contra rotating loops have been used in the past in FDDI (fibre distributed data interface) based systems they have never before been used in device level architectures. The use of a dual contra rotating loop imparts a level of system robustness not achievable with traditional parallel bus based architectures.

Further, the communications bandwidth within the device is effectively increased since any source processor 40 can transmit data in both directions to the same destination processor 40. By appropriate location of the processors 40 around the loop any particular processor can be allowed to provide twice the bandwidth into the system that it can do using a linear arrangement with the hardware being otherwise identical.

It might appear that because data is sent around the loop in both directions that some of the security advantages discussed above regarding the network architecture will be lost for the loop device architecture. However, this is not necessarily the case. The security advantages provided by the non-availability of messages at some nodes in the system can still be provided in the loop device architecture for processors which send messages in only one direction around the loop in normal operation. This would allow enhanced security to still be achieved when the device is operating normally and security would be comprised only when a failure forced the message sending direction to be altered. If the loop structure is used to increase bandwidth from a particular processor there will be a trade off between security and available bandwidth.

Figure 15:
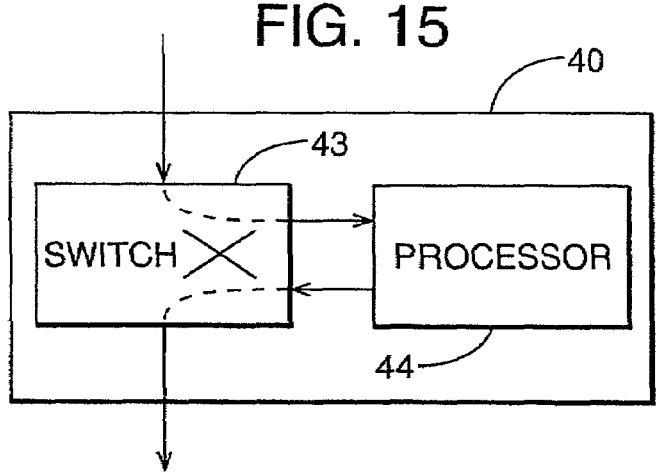
FIG. 15 shows a processor arrangement for use in the devices.

A suitable processor structure for use within the device structures shown in FIGS. 12 and 13 is shown in FIG. 15.

Analogously to the network architecture, in the device architecture each processor 40 includes a switch element 43 as well as the actual application processor 44. Accordingly, a virtual circuit will pass through the switch 43 to a particular port on the processor 44. Software controlled security is implemented by programming the switch 43 to route the selected virtual circuits, that is selected destination addresses, into the local processor 44. It is then a matter of implementations specific security rules as to the conditions under which the accepted data is reinserted into the switch for passing to the next processor 40 in the sequence. It is preferred to use ATM to carry data within the device. When ATM is used, unlike a conventional ATM switch it is preferred that the reinserted data be given the same virtual circuit header as the incoming data to avoid the need for the recipient device to be reprogrammed to a different virtual circuit to the incoming one. This renders the switch transparent from a device internal transparency perspective.

At low data rates all incoming data can be inspected, filtered and routed under software control, however at higher data rates the use of hardware switching will be desirable.

As explained above, the security provided in the network by messages not being available throughout the system will also be provided in a single device. This is more significant within a device than in a network because the physical security of the internal parts of a single device are usually much greater than the physical security of the network.

The described processor structure allows use of a very simple switch 43 on each processor since only those virtual circuits destined to be retained at that device node for use by the applications processor 44 need to be registered in the switch 43. Messages for all other virtual circuit destinations will be simply passed through unmodified.

The example illustrated in FIG. 15 does require some processing capability at each device node. Where it is desired to connect traditional peripheral devices into the device without requiring any processing support from the device, a simple dumb node in which the peripheral components are unable to control the switch 43 could be used.

In FIG. 15, only the communication of a single message stream in one direction is shown. It will also be necessary to send messages in the opposite direction and this can be carried out by the switch 43 having duplex capability and being able to send or receive messages in both directions so that the switch 43 is analogous to the local switch 3 described with respect to the network or by the provision of two separate switches 43, one for each direction of message flow so that the switch 43 is analogous to the switch block 6 described with respect to the network.

The level of data security supplied within the devices can be enhanced similarly to the data security provided across the network by providing exclusive OR masks, or other encryption facilities, to allow the messages to pass between the processors 40 at different nodes of the device to be encrypted.

Such encryption schemes are analogous to the network level encryption schemes described above and so will not be described in detail here. Such encryption can employ exclusive OR masks set under control of the applications processor 44 or set autonomously by an auxiliary security processor incorporated within the processor 40 and controlling the exclusive OR masks employed by the switch or switches 43 of the processor 40 in a similar manner to the auxiliary security processor described with regard to network security.

Similarly to the network based auxiliary security processors, the auxiliary security processors forming part of the individual processors 40 within a device can also be controlled and provided with mask seeds by a smart card.

The security advantages provided by this arrangement at device level are similar to those provided at network level.

The above-described device architectures are purely linear chains of processors 40 or loops of processors 40 and it is expected that these architectures would normally be the most convenient for real devices. However, alternative arrangements similar to those proposed for the network would be possible.

The clock rate employed between separate processors of a single device and the message size to be employed can be set in a similar manner to the techniques described above for use in the network.

The use of the above-described architectures for both a network as a whole and the individual devices within it is preferred because of the advantages provided as explained above. However, this is not essential and the described architecture is intended to be usable for networks regardless of the architecture used within the individual devices making the network and for devices regardless of the architecture of the network they are connected to or indeed whether they are connected to a network at all.

In both the network architecture and the non-loop device architecture, it is possible to connect additional devices or processors further downstream without effecting the operation of the upstream parts of the network or device. This allows hot plugging of both new devices into a network and new processors into a device without interrupting the operation of the rest of the network or device. This is not normally possible in consumer devices or products and is generally not possible with data bus based architectures.

In order to allow such hot plugging, the connectors for devices into the network or processors within a device should be arranged to link up power and ground first and then allow the newly-added element to begin receiving the clock signal from the device it has been connected downstream of. The newly-added element can then integrate itself into the network or device. This process is simplest where the network or device is a purely linear arrangement because the newly-added element can then simply be assigned an address or logical circuit number by simply incrementing the number or numbers held by the upstream device. Where a more complex network or device structure having branches is used, it will be necessary for an available unique number or numbers to be provided to the new element either by polling the network or device to identify which numbers are in use or by the devices or processors already integrated into the network or device having a record of the current status of the network or device identifying all numbers currently in use.

Such a hot plug insertion of the new processor cannot easily be carried out in a device configured as a loop unless messages are normally only sent around the loop in one direction so that the additional link 40F is normally not in use, in which case its link could be broken and re-made to include an additional processor without disturbing the operation of the rest of the device.

In the above description of both the network and device architecture and the devices and processors used therein, the generic devices and processors described are able to both send and receive messages upstream and downstream.

It will of course be realised that the most upstream or gateway element will be sending and receiving messages upstream out of the device or network while the most downstream elements will not be connected to any further downstream location. Accordingly, these elements at the extremes of the device or network do not require the capability to send or receive messages both upstream and downstream. However, in practice it will normally be preferred to retain a full upstream and downstream message sending and receiving capability in all elements to allow improved economies of scale in component production and to allow maximum flexibility in rearranging elements within a network or device even though this involves the elements at the extremes of the network or device having redundant components and capabilities.

The use of asynchronous transfer mode (ATM) as a network transport protocol is regarded as particularly advantageous in terms of network performance. However, at present the necessary hardware to implement ATM at an acceptably low cost for a domestic network is not available.

The data links between nodes in the network can be provided by mains carrier modem, category 5 twin twisted pairs, 75 Ω coaxial cable, wireless or consumer infrared. This is a list of suitable examples and is not intended to be exhaustive.

Figure 16:
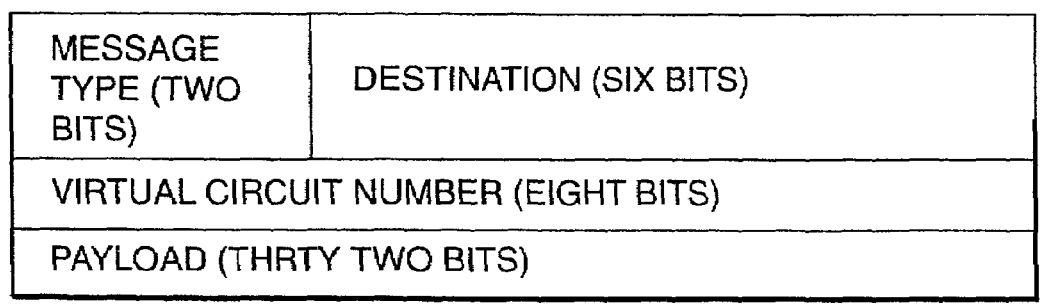
FIG. 16 shows an alternative message format for use in the network or devices.

An alternative message format to that shown in FIG. 9A is shown in FIG. 16.

In this alternative message format, the message has a fixed size with a payload of 32 bits only. Accordingly, there is no requirement for a data size code. The 6 bit source identifier is replaced by a 8 bit virtual circuit number used to identify the source.

The message formats given are purely examples. As other alternatives, it would be possible to include message type and size in a single code if a variable message size was required rather than having separate message type and message size codes.

The above described examples are surely exemplary and the person skilled in the art will realise that numerous changes and substitutions can be made within the scope of the invention which is defined by the appended claims.

The invention claimed is:

1. A device having at least first and second communications sections suitable for connection to similar devices along different bi-directional communications links, said first communications section being arranged to respond to reception of a clock transition signal along a first communications link by transmitting a clock transition signal having the same polarity back along said first communications link, and said second communications section arranged to respond to reception of a clock transition signal along a second communications link by transmitting a clock transition signal having the opposite polarity back along said second communications link.

2. A device as claimed in claim 1, wherein said first communications section holds a first clock logic level and an output, when the first communications section is not connected to another device, and wherein said second communications section holds a second clock logic level having an opposite polarity to the first clock state logic level as an input, when the second communications section is not connected to another device.

3. A device as claimed in claim 1, wherein said second communications section holds a first clock logic level as an output, when the second communications section is not connected to another device, and wherein said first communications section holds a second clock logic level having an opposite polarity to the first clock state logic level as an output, when the first communications section is not connected to another device.

4. A device as claimed in claim 1, wherein the linked communication sections form a loop, when the first communications section is linked to the second communications section of another device or vice-versa through a bi-directional communications link, and wherein the device uses an oscillating clock transition signal passing around the loop as a clock signal for communication along the communications link.

5. A device as claimed in claim 4, in which, when the first and second communication sections are first linked, the difference between their held input and output clock logic levels causes the oscillating clock transition signals to begin passing around the loop.

6. An electronic communication network comprising at least first and second devices connected by at least one bi-directional communications link, wherein a loop is formed by said first device receiving a clock transition signal along the communications link and sending a clock transition signal having the same polarity back along the communications link and said second device receiving a clock transition signal along the communications link and sending a clock transition signal having the opposite polarity back along the communications link, and wherein the first and second devices use the oscillating clock transition signals traveling around the loop to provide a clock signal to control data transfer along the communications link.

7. A network as claimed in claim 6, in which the clock transition signals traveling around the loop are used as said clock signal.

* * * * *